(12) United States Patent
Tillack et al.

(10) Patent No.: US 7,754,811 B2
(45) Date of Patent: Jul. 13, 2010

(54) NC-PU DISPERSIONS WITH ACCELERATED DRYING

(75) Inventors: Jörg Tillack, Berg.-Gladbach (DE); Sebastian Dörr, Düsseldorf (DE); Rainer Trinks, Dormagen (DE); Maria Almato, Barcelona (ES)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/193,270

(22) Filed: Aug. 18, 2008

(65) Prior Publication Data

US 2009/0062468 A1 Mar. 5, 2009

(30) Foreign Application Priority Data

Aug. 22, 2007 (EP) .................. 07016420

(51) Int. Cl.
*C08F 297/04* (2006.01)
(52) U.S. Cl. ....................................... 525/54
(58) Field of Classification Search .................... 525/54
See application file for complete search history.

(56) References Cited

U.S. PATENT DOCUMENTS

| 4,066,818 | A | 1/1978 | Junge et al. |
| 4,306,998 | A | 12/1981 | Wenzel et al. |
| 4,517,324 | A | 5/1985 | Lühmann et al. |
| 4,772,329 | A | 9/1988 | Lühmann et al. |
| 5,670,141 | A | 9/1997 | Nehra |
| 6,129,979 | A | 10/2000 | Kawamata et al. |
| 6,509,396 | B1 * | 1/2003 | Hoppe et al. ................... 524/35 |
| 2007/0219296 | A1 * | 9/2007 | Trinks et al. ................... 524/27 |
| 2007/0243149 | A1 * | 10/2007 | Hofacker et al. .............. 424/61 |

FOREIGN PATENT DOCUMENTS

| DE | 102006012354 A1 | 9/2007 |
| EP | 0076443 A2 | 4/1983 |
| EP | 0154241 A2 | 9/1985 |
| EP | 0916647 A2 | 5/1999 |
| EP | 1074590 A2 | 2/2001 |
| GB | 1465415 | 2/1977 |
| JP | 03247624 | 11/1991 |
| JP | 03294370 | 12/1991 |
| JP | 6314735 | 11/1994 |
| JP | 07331118 | 12/1995 |
| WO | WO-92/01817 A1 | 2/1992 |

* cited by examiner

*Primary Examiner*—Ling-Siu Choi
*Assistant Examiner*—Sonya Wright
(74) *Attorney, Agent, or Firm*—Eamonn P. Morrison

(57) ABSTRACT

The invention relates to hybrid dispersions comprising nitrocellulose-polyurethanepolyurea particles (NC-PU dispersions) with accelerated drying behavior as compared with the known systems, and also to their use in coating materials.

18 Claims, No Drawings

NC-PU DISPERSIONS WITH ACCELERATED DRYING

RELATED APPLICATIONS

This application claims benefit to European Application 07 016 420.7 filed Aug. 22, 2007 which is incorporated herein by reference in its entirety for all useful purposes.

BACKGROUND OF THE INVENTION

The invention relates to hybrid dispersions comprising nitrocellulose-polyurethanepolyurea particles (NC-PU dispersions) with accelerated drying behavior as compared with the known systems, and also to their use in coating materials.

Nitrocellulose or cellulose nitrate or cellulose ester of nitric acid is employed in a variety of fields of application on account of its diverse processing and end-application properties.

The prior art discloses solvent-borne nitrocellulose compositions as, for example, furniture varnishes, printing inks or overprint varnishes. These coating systems are notable for rapid drying.

In many cases, however, the desire is to replace solvent-borne systems by aqueous systems, owing to statutory requirements and also owing to aspects of occupational hygiene, health and environmental protection, while at the same time very largely retaining the desired, positive application properties, such as the rapid drying, for example.

Consequently there have been diverse attempts described in the prior art for providing nitrocellulose-containing coating systems on the basis of an aqueous carrier medium that do partly or wholly without organic solvents and coalescers.

U.S. Pat. No. 5,670,141, for example, first produces aqueous emulsions containing nitrocellulose, which requires costly and inconvenient emulsifying steps. Furthermore, these emulsions also contain solvents or plasticizers. Then, subsequently, the emulsions are combined with different polymers to form an aqueous system. In this way, mixtures are formed of independently produced nitrocellulose on the one hand with polymer dispersions on the other.

A different process becomes apparent, for example, in WO-A 92/01817, where nitrocellulose emulsions and different aqueous systems are applied in succession as a coating to a substrate such as leather, for example, hence always resulting in two or more operating steps.

In the prior art such as, for example, JP-A 03 294 370, JP-A 03 247 624 or JP-A 58-83 001, solvent-borne systems based on nitrocellulose and polyurethane are known. The nitrocellulose compositions described therein are used as dispersing media for magnetic powders.

JP-A 63-14735 discloses aqueous resin emulsions based on water-dispersible, urethane-modified vinyl polymers and nitrocellulose. The vinyl polymer possesses an ionic group and a polyurethane side chain, and serves as a dispersing medium for the nitrocellulose. The compositions described therein are employed as coating compositions. The resin emulsion is prepared by dissolving both the vinyl polymer and the nitrocellulose in an organic solvent, then adding water and dispersing the polymer using a neutralizing agent. The organic solvent can be removed before or after the dispersing operation. A disadvantage of these systems is their poor storage stability when the amount of solvent is reduced considerably by distillation.

EP 1 074 590 A2 describes coating materials comprising nitrocellulose. That invention, however, relates to 2K (2-component) applications, which have the disadvantages of the restricted processing life. Moreover, in those systems the use of plasticizers is mandatory.

EP 0 076 443 describes viscous, nitrocellulose-containing mixtures for producing aqueous coating emulsions In those mixtures too a plasticizer is mandatory.

EP 0 154 241 A2 describes systems comprising nitrocellulose that are UV-curing. A disadvantage of that process is that after thermal drying it is also necessary to carry out a second curing step.

JP 07 331 118 describes a water-based, quick-drying basecoat material for automotive refinish application, its formulation involving the addition of an aqueous nitrocellulose derivative. Normal nitrocellulose is hydrophobic and insoluble in water. In order to make the nitrocellulose water-soluble it must be hydrophilicized. This hydrophilicity is then retained subsequently in the completed coating film. This is also the reason why the hydrophilicized nitrocellulose has not become established in the market.

Described for the first time in German Patent Application No. 10 2006 012354, unpublished at the priority date of the present specification, are NC-PU dispersions with which success is achieved in incorporating inherently hydrophobic nitrocelluloses stably into aqueous dispersions and hence combining the profiles of properties of nitrocellulose coating materials and polyurethane coating materials. Deserving of improvement, however, is the comparatively slow drying behavior of films and coatings obtainable from those dispersions.

Building on DE 10 2006 012354 it has now surprisingly been found that a blend of such hybrid NC-PU dispersions with aqueous, non-nitrocellulose-containing polyurethane-polyurea dispersions (PU dispersions) leads to significantly more rapid drying as compared with NC-PU dispersions according to DE 10 2006 012354 that have the same solids content and nitrocellulose fraction.

EMBODIMENTS OF THE INVENTION

An embodiment of the present invention is an aqueous NC-PU dispersion at least comprising nitrocellulose-polyurethanepolyurea particles having an average particle size of 20 to 700 nm and also nitrocellulose-free polyurethanepolyurea particles having an average particle size of 20 to 700 nm as measured by means of laser correlation spectroscopy.

Another embodiment of the present invention is the above aqueous NC-PU dispersion, wherein the dispersion is plasticizer-free and contains equal or less than 1% by weight of organic solvents.

Another embodiment of the present invention is the above aqueous NC-PU dispersion, wherein the ratio of nitrocellulose-polyurethanepolyurea particles to nitrocellulose-free polyurethanepolyurea particles is 100:1 to 1:100.

Another embodiment of the present invention is the above aqueous NC-PU dispersion, wherein the dispersion has a solids content, based on nitrocellulose-polyurethanepolyurea particles and nitrocellulose-free polyurethanepolyurea particles, of 30% to 63% by weight.

Another embodiment of the present invention is the above aqueous NC-PU dispersion, wherein the dispersion has a solids content, based on nitrocellulose-polyurethanepolyurea particles and nitrocellulose-free polyurethanepolyurea particles, of 30% to 63% by weight and the ratio of nitrocellulose-polyurethanepolyurea particles to nitrocellulose-free polyurethanepolyurea particles is 100:1 to 1:100

Yet another embodiment of the present invention is a process for preparing an aqueous NC-PU dispersion comprising mixing an aqueous NC-PU dispersion (I) which comprises nitrocellulose-polyurethanepolyurea particles having an average particle size of 20 to 700 nm with an aqueous PU dispersion (II) comprising nitrocelluose-free polyurethanepolyurea particles having an average particle size of 20 to 700 nm.

Another embodiment of the present invention is the above process, wherein the NC-PUD dispersion (I) are obtained by preparing
- A) isocyanate-functional prepolymers from
  - A1) organic polyisocyanates,
  - A2) polymeric polyols having number-average molecular weights of 400 to 8000 g/mol and OH functionalities of 1.5 to 6,
  - A3) hydroxy-functional compounds having molecular weights of 62 to 399 g/mol and
  - A4) isocyanate-reactive, anionic or potentially anionic and optionally nonionic hydrophilicizing agents,
- B) whose free NCO groups are then reacted wholly or partially, before, during or after the addition of an organic solvent, with
  - B1) amino-functional compounds having molecular weights of 32 to 399 g/mol and/or
  - B2) amino-functional, anionic or potentially anionic hydrophilicizing agents, with chain extension,
- C) dispersing the prepolymers in water before, during or after step B), any potentially ionic groups present being converted into the ionic form by partial or complete reaction with a neutralizing agent,
- D) adding nitrocellulose in the form of a solution in an organic solvent or solvent mixture after step A) but before step C), and
- E) removing organic solvent present by distillation to leave an amount of below 5% by weight.

Another embodiment of the present invention is the above process, wherein said polymeric polyols have number-average molecular weights of 400 to 6000 g/mol and OH functionalities of 1.8 to 3.

Another embodiment of the present invention is the above process, wherein said polymeric polyols have number-average molecular weights of 600 to 3000 g/mol, and OH functionalities of 1.9 to 2.1.

Another embodiment of the present invention is the above process, wherein the PU dispersion (II) is obtained by preparing
- a) isocyanate-functional prepolymers from
  - a1) organic polyisocyanates,
  - a2) polymeric polyols having number-average molecular weights of 400 to 8000 g/mol and OH functionalities of 1.5 to 6,
  - a3) hydroxy-functional compounds having molecular weights of 62 to 399 g/mol and
  - a4) isocyanate-reactive, anionic or potentially anionic and optionally nonionic hydrophilicizing agents,
- b) whose free NCO groups are then reacted wholly or partially, before, during or after the addition of an organic solvent, with
  - b1) amino-functional compounds having molecular weights of 32 to 399 g/mol and/or
  - b2) amino-functional, anionic or potentially anionic hydrophilicizing agents, with chain extension,
- c) dispersing the prepolymers in water before, during or after step B), any potentially ionic groups present being converted into the ionic form by partial or complete reaction with a neutralizing agent,
- d) removing organic solvent present by distillation to leave an amount of below 5% by weight.

Another embodiment of the present invention is the above process, wherein the PU dispersion (II) is obtained by preparing
- a) isocyanate-functional prepolymers from
  - a1) organic polyisocyanates,
  - a2) polymeric polyols having number-average molecular weights of 400 to 8000 g/mol and OH functionalities of 1.5 to 6,
  - a3) hydroxy-functional compounds having molecular weights of 62 to 399 g/mol and
  - a4) isocyanate-reactive, anionic or potentially anionic and optionally nonionic hydrophilicizing agents,
- b) whose free NCO groups are then reacted wholly or partially, before, during or after the addition of an organic solvent, with
  - b1) amino-functional compounds having molecular weights of 32 to 399 g/mol and/or
  - b2) amino-functional, anionic or potentially anionic hydrophilicizing agents, with chain extension,
- c) dispersing the prepolymers in water before, during or after step B), any potentially ionic groups present being converted into the ionic form by partial or complete reaction with a neutralizing agent,
- d) removing organic solvent present by distillation to leave an amount of below 5% by weight.

Another embodiment of the present invention is the above process, wherein said polymeric polyols have number-average molecular weights of 400 to 6000 g/mol and OH functionalities of 1.8 to 3.

Another embodiment of the present invention is the above process, wherein said polymeric polyols have number-average molecular weights of 600 to 3000 g/mol, and OH functionalities of 1.9 to 2.1.

Another embodiment of the present invention is the above process, wherein said polymeric polyols have number-average molecular weights of 600 to 3000 g/mol, and OH functionalities of 1.9 to 2.1.

Another embodiment of the present invention is the above process, wherein the NC-PU dispersion (I) and the PU dispersion (II) independently of one another have a solids content of 20% to 65% by weight.

Another embodiment of the present invention is the above process, wherein the NC-PU dispersion (I) has a nitrocellulose content, based on the solids, of 20% to 60% by weight.

Yet another embodiment of the present invention is an aqueous NC-PU dispersion obtained by the above process.

Yet another embodiment of the present invention is a single-coat or multi-coat paint system which comprises the above aqueous NC-PU dispersion.

Yet another embodiment of the present invention is a coating composition comprising the above aqueous NC-PU dispersion.

Yet another embodiment of the present invention is a substrate coated with the above coatings composition.

DETAILED DESCRIPTION OF THE INVENTION

As used herein, the singular terms "a" and "the" are synonymous and used interchangeably with "one or more" and "at least one," unless the language and/or context clearly indicates otherwise. Additionally, all numerical values, unless otherwise specifically noted, are understood to be modified by the word "about."

The invention accordingly provides aqueous NC-PU dispersions at least comprising nitrocellulose-polyurethanepolyurea particles having an average particle size of 20 to 700 nm and also nitrocellulose-free polyurethanepolyurea particles likewise having an average particle size of 20 to 700 nm as measured by means of laser correlation spectroscopy (Zetasizer 1000, Malvern Instruments, Malvern, UK).

The aqueous NC-PU dispersions of the invention are plasticizer-free and based on the overall formulation contain less than 5% by weight, preferably $\leq 2\%$ by weight, more preferably $\leq 1\%$ by weight of organic solvents. By plasticizers are meant compounds such as phthalates, castor oil, acetyl tributyl citrate or alkylated phosphates.

In the aqueous NC-PU dispersions of the invention the weight relationship between the nitrocellulose-polyurethanepolyurea particles and the nitrocellulose-free polyurethanepolyurea particles is preferably 100:1 to 1:100, more preferably 20:1 to 1:20 and very preferably 5:1 to 1:5.

The dispersions of the invention are obtainable by mixing aqueous NC-PU dispersions (I) comprising nitrocellulose-polyurethanepolyurea particles having an average particle size of 20 to 700 nm with aqueous PU dispersions (II) comprising nitrocelluose-free polyurethanepolyurea particles having an average particle size of 20 to 700 nm.

The parent NC-PUD dispersions (I) are obtainable by preparing

F) isocyanate-functional prepolymers from
  A1) organic polyisocyanates,
  A2) polymeric polyols having number-average molecular weights of 400 to 8000 g/mol, preferably 400 to 6000 g/mol and more preferably of 600 to 3000 g/mol, and OH functionalities of 1.5 to 6, preferably 1.8 to 3, more preferably of 1.9 to 2.1,
  A3) hydroxy-functional compounds having molecular weights of 62 to 399 g/mol and
  A4) isocyanate-reactive, anionic or potentially anionic and optionally nonionic hydrophilicizing agents,
G) whose free NCO groups are then reacted wholly or partially, before, during or after the addition of an organic solvent, with
  B1) amino-functional compounds having molecular weights of 32 to 399 g/mol and/or
  B2) amino-functional, anionic or potentially anionic hydrophilicizing agents, with chain extension,
H) dispersing the prepolymers in water before, during or after step B), any potentially ionic groups present being converted into the ionic form by partial or complete reaction with a neutralizing agent,
I) adding nitrocellulose in the form of a solution in an organic solvent or solvent mixture after step A) but before step C), and
J) removing organic solvent present by distillation.

Preferred organic solvents for preparing the dispersions essential to the invention are aliphatic ketones, more preferably acetone or 2-butanone.

Suitable polyisocyanates of component A1) are the aromatic, araliphatic, aliphatic or cycloaliphatic polyisocyanates known per se to the skilled person that have an NCO functionality of $\geq 2$.

Examples of such suitable polyisocyanates are 1,4-butylene diisocyanate, 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof with any desired isomer content, 1,4-cyclohexylene diisocyanate, 1,4-phenylene diisocyanate, 2,4- and/or 2,6-tolylene diisocyanate, 1,5-naphthylene diisocyanate, 2,2'- and/or 2,4'- and/or 4,4'-diphenylmethanediisocyanate, 1,3- and/or 1,4-bis(2-isocyanatoprop-2-yl)benzene (TMXDI), 1,3-bis(isocyanatomethyl)benzene (XDI), (S)-alkyl 2,6-diisocyanatohexanoate, (L)-alkyl 2,6-diisocyanatohexanoate, with branched, cyclic or acyclic alkyl groups having up to 8 C atoms.

Besides the abovementioned polyisocyanates it is also possible at the same time to make proportional use of modified diisocyanates with uretdione, isocyanurate, urethane, allophanate, biuret, iminooxadiazinedione and/or oxadiazinetrione structure, and also of unmodified polyisocyanate having more than 2 NCO groups per molecule such as, for example, 4-isocyanatomethyloctane 1,8-diisocyanate (nonane triisocyanate) or triphenylmethane 4,4',4"-triisocyanate.

The substances in question are preferably polyisocyanates or polyisocyanate mixtures of the abovementioned kind containing exclusively aliphatically and/or cycloaliphatically attached isocyanate groups and having an average NCO functionality of the mixture of 2 to 4, preferably 2 to 2.6 and more preferably 2 to 2.4.

Particular preference is given to using in A1) hexamethylene diisocyanate, isophorone diisocyanate, the isomeric bis (4,4'-isocyanatocyclohexyl)methanes, and mixtures thereof.

In A2) use is made of polymeric polyols having a number-average molecular weight $M_n$ of 400 to 8000 g/mol, preferably of 400 to 6000 g/mol and more preferably of 600 to 3000 g/mol. These polyols preferably have an OH functionality of 1.5 to 6, more preferably of 1,8 to 3, very preferably of 1.9 to 2.1

Polymeric polyols of this kind are the conventional polyurethane coating technology polyester polyols, polyacrylate polyols, polyurethane polyols, polycarbonate polyols, polyether polyols, polyester polyacrylate polyols, polyurethane polyacrylate polyols, polyurethane polyester polyols, polyurethane polyether polyols, polyurethane polycarbonate polyols, polyester polycarbonate polyols and phenol/formaldehyde resins. In A1) they can be used individually or in any desired mixtures with one another.

Polyester polyols of this kind are the conventional polycondensates of diols and also, optionally, triols and tetraols and of dicarboxylic acid and also, optionally, tricarboxylic and tetracarboxylic acids or hydroxycarboxylic acids or lactones. Instead of the free polycarboxylic acids it is also possible to use the corresponding polycarboxylic anhydrides or corresponding polycarboxylic esters of lower alcohols to prepare the polyesters.

Examples of suitable diols are ethylene glycol, butylene glycol, diethylene glycol, triethylene glycol, polyalkylene glycols such as polyethylene glycol, and also 1,2-propanediol, 1,3-propanediol, butane-1,3-diol, butane-1,4-diol, hexane-1,6-diol and isomers, neopentyl glycol or neopentyl glycol hydroxypivalate, preference being given to hexane-1, 6-diol and isomers, neopentyl glycol and neopentyl glycol hydroxypivalate. Besides these it is also possible to use polyols such as trimethylolpropane, glycerol, erythritol, pentaerythritol, trimethylolbenzene or trishydroxyethyl isocyanurate.

Dicarboxylic acids which can be used include phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid and/or 2,2-dimethylsuccinic acid. As a source of acid it is also possible to use the corresponding anhydrides.

Where the average functionality of the polyol for esterification is >than 2, it is also possible at the same time, additionally, to use monocarboxylic acids, such as benzoic acid and hexanecarboxylic acid.

Preferred acids are aliphatic or aromatic acids of the aforementioned kind. Particularly preferred are adipic acid, isophthalic acid and, optionally, trimellitic acid.

Examples of hydroxycarboxylic acids which can be used as reaction participants when preparing a polyester polyol having terminal hydroxyl groups include hydroxycaproic acid, hydroxybutyric acid, hydroxydecanoic acid, hydroxystearic acid and the like. Suitable lactones are caprolactone, butyrolactone and homologs. Caprolactone is preferred.

It is likewise possible in A2) to use hydroxyl-containing polycarbonates, preferably polycarbonate diols, having number-average molecular weights $M_n$ of 400 to 8000 g/mol, preferably 600 to 3000 g/mol. These compounds are obtainable by reacting carbonic acid derivatives, such as diphenyl carbonate, dimethyl carbonate or phosgene, with polyols, preferably diols.

Examples of such diols are ethylene glycol, 1,2- and 1,3-propanediol, 1,3- and 1,4-butanediol, 1,5-pentanediol, 1,6-hexanediol, 1,8-octanediol, neopentyl glycol, 1,4-bishydroxymethylcyclohexane, 2-methyl-1,3-propanediol, 2,2,4-trimethylpentane-1,3-diol, 3-methyl-1,5-pentanediol, dipropylene glycol, polypropylene glycols, dibutylene glycol, polybutylene glycols, bisphenol A, tetrabromobisphenol A and lactone-modified diols of the aforementioned kind.

The diol component preferably contains 40% to 100% by weight of hexanediol, preference being given to 1,6-hexanediol and/or hexanediol derivatives. Such hexanediol derivatives are based on hexanediol and besides terminal OH groups contain ester or ether groups. Derivatives of this kind are obtainable by reacting hexanediol with excess caprolactone or by etherifying hexanediol with itself to form the di- or trihexylene glycol.

Instead of or in addition to pure polycarbonate diols it is also possible to use polyether polycarbonate diols in A2).

Hydroxyl-containing polycarbonates are preferably of linear construction but can also be obtained easily through the incorporation of polyfunctional components, more particularly polyols of low molecular mass. Examples of those suitable for this purpose include glycerol, trimethylolpropane, hexane-1,2,6-triol, butan-1,2,4-triol, trimethylolpropane, trimethylolethane, pentaerythritol, quinitol, mannitol, sorbitol, methylglycoside or 1,3,4,6-dianhydrohexitols.

In A2) it is likewise possible to use polyether polyols. Examples of those suitable include the polytetramethylene glycol polyethers that are known per se in polyurethane chemistry, of the kind obtainable by polymerizing tetrahydrofuran by means of cationic ring opening.

Likewise suitable polyether polyols are the conventional adducts of styrene oxide, ethylene oxide, propylene oxide, butylene oxides and/or of epichlorohydrin with difunctional or polyfunctional starter molecules.

Suitable starter molecules that can be used are all of the compounds known from the prior art, such as, for example, water, butyl diglycol, glycerol, diethylene glycol, trimethylolpropane, propylene glycol, sorbitol, ethylenediamine, triethanolamine, 1,4-butanediol.

As A2) it is preferred to use polyester polyols, polytetramethylene glycol polyethers and/or polycarbonate polyols.

In A3) it is possible to use polyols having molecular weights of 62 to 399 g/mol and having up to 20 carbon atoms. These may be ethylene glycol, diethylene glycol, triethylene glycol, 1,2-propanediol, 1,3-propanediol, 1,4-butanediol, 1,3-butylene glycol, cyclohexanediol, 14-cyclohexanedimethanol, 1,6-hexanediol, neopentyl glycol, hydroquinone dihydroxyethyl ether, bisphenol A (2,2'-bis(4-hydroxyphenyl)propane), hydrogenated bisphenol A (2,2'-bis(4-hydroxycyclohexyl)propane), trimethylolpropane, glycerol, pentaerythritol and also any desired mixtures of these with one another.

Also suitable are ester diols of the stated molecular weight range such as α-hydroxybutyl-ε-hydroxycaproic ester, ω-hydroxyhexyl-γ-hydroxybutyric ester, adipic acid β-hydroxyethyl ester or terephthalic acid bis(β-hydroxyethyl)ester.

It is further possible in A3) to use monofunctional isocyanate-reactive hydroxyl-containing compounds as well. Examples of such monofunctional compounds are ethanol, n-butanol, ethylene glycol monobutyl ether, diethylene glycol monomethyl ether, ethylene glycol monobutyl ether, diethylene glycol monobutyl ether, propylene glycol monomethyl ether, dipropylene glycol monomethyl ether, tripropylene glycol monomethyl ether, dipropylene glycol monopropyl ether, propylene glycol monobutyl ether, dipropylene glycol monobutyl ether, tripropylene glycol monobutyl ether, 2-ethylhexanol, 1-octanol, 1-dodecanol, 1-hexadecanol.

By anionically or potentially anionically hydrophilicizing compounds of component A4) are meant all compounds which contain at least one isocyanate-reactive hydroxyl group and also at least one functionality, such as —COOY, —SO$_3$Y, —PO(OY)$_2$ (Y for example=H$^+$, NH$_4^+$, metal cation), for example, that on interaction with aqueous media enters into a pH-dependent dissociation equilibrium and in that way may carry a negative or neutral charge, Suitable anionically or potentially anionically hydrophilicizing compounds are mono- and dihydroxycarboxylic acids, mono- and dihydroxysulphonic acids, and also mono- and dihydroxyphosphonic acids and their salts. Examples of such anionic or potentially anionic hydrophilicizing agents are dimethylol propionic acid, dimethylolbutyric acid, hydroxypivalic acid, malic acid, citric acid, glycolic acid, lactic acid, and the adduct of sodium bisulphite with but-2-ene-1,4-diol, polyethersulphonate and the propoxylated adduct of 2-butenediol and NaHSO$_3$, as described in DE-A 2 446 440, page 5-9, formula I-III. Preferred anionic or potentially anionic hydrophilicizing agents of component A4) are those of the aforementioned kind which possess carboxyl or carboxylate and/or sulphonate groups.

Particularly preferred anionic or potentially anionic hydrophilicizing agents are those which contain carboxyl and/or sulphonate groups as ionic or potentially ionic groups, such as the salts of dimethylolpropionic acid or dimethylolbutyric acid.

Suitable nonionically hydrophilicizing compounds of component A4) are, for example, polyoxyalkylene ethers which contain at least one hydroxyl or amino group.

Examples are the monohydroxy-functional polyalkylene oxide polyether alcohols containing on average per molecule 5 to 70, preferably 7 to 55, ethylene oxide units, of the kind obtainable in conventional manner by alkoxylation of suitable starter molecules (e.g. in Ullmanns Encyclopädie der technischen Chemie, 4th Edition, Volume 19, Verlag Chemie, Weinheim pp. 31-38).

These are either pure polyethylene oxide ethers or mixed polyalkylene oxide ethers, containing at least 30 mol %, preferably at least 40 mol %, based on all of the alkylene oxide units present, of ethylene oxide units.

Particularly preferred nonionic compounds are monofunctional mixed polyalkylene oxide polyethers which contain 40 to 100 mol % ethylene oxide units and 0 to 60 mol % propylene oxide units.

Suitable starter molecules for nonionic hydrophilicizing agents of this kind are saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers, such as diethylene glycol monobutyl ether, for example, unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine and also heterocyclic secondary amines such as morpholine, pyrrolidine, piperidine or 1H-pyrazole. Preferred starter molecules are saturated monoalcohols of the abovementioned kind. Particular preference is given to using diethylene glycol monobutyl ether or n-butanol as starter molecules.

Alkylene oxides suitable for the alkoxylation reaction are more particularly ethylene oxide and propylene oxide, which can be used in either order or else in a mixture in the alkoxylation reaction.

As component B1) it is possible to use diamines or polyamines such as 1,2-ethylenediamine, 1,2- and 1,3-diaminopropane, 1,4-diaminobutane, 1,6-diaminohexane, isophoronediamine, isomer mixture of 2,2,4- and 2,4,4-trimethylhexamethylenediamine, 2-methylpentamethylenediamine, diethylenetriamine, 1,3- and 1,4-xylylenediamine, $\alpha,\alpha,\alpha',\alpha'$-tetramethyl-1,3- and -1,4-xylylenediamine and 4,4-diaminodicyclohexylmethane and/or dimethylethylenediamine. Likewise possible is the use of hydrazine or hydrazides such as adipic dihydrazide.

Furthermore it is also possible as component B1) to use compounds which besides a primary amino group also contain secondary amino groups or besides an amino group (primary or secondary) also contain OH groups. Examples thereof are primary/secondary amines, such as diethanolamine, 3-amino-1-methylaminopropane, 3-amino-1-ethylaminopropane, 3-amino-1-cyclohexylaminopropane, 3-amino-1-methylaminobutane, alkanolamines such as N-aminoethylethanolamine, ethanolamine, 3-aminopropanol, neopentanolamine.

Furthermore it is also possible as component B1) to use monofunctional isocyanate-reactive amine compounds, such as, for example, methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl (methyl)aminopropylamine, morpholine, piperidine, and/or suitable substituted derivatives thereof, amide amines formed from diprimary amines and monocarboxylic acids, monoketimes of diprimary amines, primary/tertiary amines, such as N,N-dimethylaminopropylamine.

By anionically or potentially anionically hydrophilicizing compounds of component B2) are meant all compounds which contain at least one isocyanate-reactive amino group and also at least one functionality, such as —COOY, —SO$_3$Y, —PO(OY)$_2$ (Y for example=H$^+$, NH$_4^+$, metal cation), for example, that on interaction with aqueous media enters into a pH-dependent dissociation equilibrium and in that way may carry a negative or neutral charge.

Suitable anionically or potentially anionically hydrophilicizing compounds are mono- and diaminocarboxylic acids, mono- and diaminosulphonic acids and also mono- and diamino-phosphonic acids and their salts. Examples of such anionic or potentially anionic hydrophilicizing agents are N-(2-aminoethyl)-β-alanine, 2-(2-aminoethylamino)ethanesulphonic acid, ethylenediamine-propyl- or -butylsulphonic acid, 1,2- or 1,3-propylenediamine-β-ethylsulphonic acid, glycine, alanine, taurine, lysine, 3,5-diaminobenzoic acid and the adduct of IPDI and acrylic acid (EP-A 0 916 647, Example 1). It is possible additionally to use cyclohexylaminopropanesulphonic acid (CAPS) from WO-A 01/88006 as an anionic or potentially anionic hydrophilicizing agent.

Preferred anionic or potentially anionic hydrophilicizing agents of component B2) are those of the aforementioned kind which possess carboxyl or carboxylate and/or sulphonate groups.

Particularly preferred anionic or potentially anionic hydrophilicizing agents B2) are those which contain carboxylate and/or sulphonate groups as ionic or potentially ionic groups, such as the salts of N-(2-aminoetlhyl)-β-alanine, of 2-(2-aminoethylamino)ethanesulphonic acid or of the adduct of IPDI and acrylic acid (EP-A 0 916 647, Example 1).

The aminic components B1), B2) may optionally be used in water-diluted or solvent-diluted form in the process of the invention, individually or in mixtures, with any sequence of addition being possible in principle.

If water or organic solvents are among the diluents used, then the diluent content of the component used in B) for chain extension is preferably 70% to 95% by weight.

The ratio of NCO groups of the compounds from component A1) to NCO-reactive groups such as amino, hydroxyl or thiol groups of the compounds of components A2) to A4) when preparing the NCO-functional prepolymer is 1.05 to 3.5, preferably 1.2 to 3.0, more preferably 1.3 to 2.5.

The amino-functional compounds in stage B) are used in an amount such that the equivalent ratio of isocyanate-reactive amino groups of these compounds to the free isocyanate groups of the prepolymer is 40% to 150%, preferably between 50% to 125%, more preferably between 60% to 120%.

In one preferred embodiment components A1) to A4) and B1) to B2) are used in the following amounts, the individual amounts always adding to 100% by weight:

5% to 40% by weight of component A1),
55% to 90% by weight of component A2),
0.5% to 20% by weight of components A3) and B1), and
0.1% to 25% by weight of components A4) and B2), with 0.1% to 5% by weight of anionic or potentially anionic hydrophilicizing agents A4) and B2), based on the total amounts of components A1) to A4) and B1) to B2), being used.

In one particularly preferred embodiment components A1) to A4) and B1) to B2) are used in the following amounts, the individual amounts always adding to 100% by weight:

5% to 35% by weight of component A1),
60% to 90% by weight of component A2),
0.5% to 15% by weight of components A3) and B1), and
0.1% to 15% by weight of components A4) and B2), with 0.2% to 4% by weight of anionic or potentially anionic hydrophilicizing agents A4) and B2), based on the total amounts of components A1 to A4) and B1) to B2), being used.

In one very particularly preferred embodiment components A1 to A4) and B1) to B2) are used in the following amounts, the individual amounts always adding to 100% by weight:

10% to 30% by weight of component A1,
65% to 85% by weight of component A2),
0.5% to 14% by weight of components A3) and B1), and
0.1% to 13.5% by weight of components A4) and B2), with 0.5% to 3.0% by weight of anionic or potentially anionic hydrophilicizing agents, based on the total amounts of components A1) to A4), being used.

In the neutralizing step C) for the partial or complete conversion of potentially anionic groups into anionic groups, bases such as tertiary amines are used, examples being trialkylamines having 1 to 12, preferably 1 to 6 C atoms in each alkyl radical, or alkali metal bases are used, such as the corresponding hydroxides.

Examples thereof are trimethylamine, triethylamine, methyldiethylamine, tripropylamine, N-methylmorpholine, methyldiisopropylamine, ethyldiisopropylamine and diisopropylethylamine. The alkyl radicals may for example also carry hydroxyl groups, as in the case of the dialkylmonoalkanolamines, alkyldialkanolamines and trialkanolamines. As neutralizing agents it is also possible optionally to use inorganic bases, such as aqueous ammonia solution or sodium hydroxide or potassium hydroxide.

Preference is given to ammonia, triethylamine, triethanolamine, dimethylethanolamine or diisopropylethylamine and also sodium hydroxid.

The molar amount of the bases is generally 50 and 125 mol %, preferably between 70 and 100 mol % of the molar amount of the acid groups to be neutralized. Neutralization may also take place simultaneously with dispersing, by the dispersing water already containing the neutralizing agent.

Dispersing in water in accordance with step C) takes place preferably following the chain extension.

For dispersing in water, either the dissolved and chain-extended polyurethanepolymer is introduced into the dispersing water, optionally with strong shearing, such as vigorous stirring, for example, or else, conversely, the dispersing water is stirred into the chain-extended polyurethanepolymer solutions. Preferably the water is added to the dissolved, chain-extended polyurethanepolymer.

Suitable nitrocellulose in stage D) is water-insoluble nitrocellulose of all nitrogen contents and viscosity levels. Of preferential suitability are nitrocelluloses which feature, for example, the typical qualities of collodion (regarding the term "collodion" cf. Römpp's Chemielexikon, Thieme Verlag, Stuttgart), i.e. cellulose nitric esters, having a nitrogen content of 10% to 12.8% by weight, preferably a nitrogen fraction of 10.7% to 12.3% by weight based on dry nitrocellulose matter.

Particularly preferred are cellulose nitric esters having a nitrogen content of 10.7% to 12.6% by weight, very preferably of 10.7% to 12.3% by weight. Examples of such cellulose nitric esters are the Walsroder® nitrocellulose A types (Wolff Cellulosics GmbH & Co. KG, Bomlitz, DE) with a nitrogen content of 10.7% to 11.3% by weight, or Walsroder® nitrocellulose AM types (Wolff Cellulosics GmbH & Co. KG, Bomlitz DE), which have a nitrogen content of 11.3% to 11.8% by weight, or Walsroder® nitrocellulose E types (Wolff Cellulosics GmbH & Co. KG, Bomlitz DE) with a nitrogen content of 11.8% to 12.3% by weight.

Within the aforementioned cellulose nitric esters with defined nitrogen contents, all viscosity levels are suitable in each case. Low-viscosity cellulose nitric esters with different nitrogen contents are classed accordingly by ISO 14446 into the following groups: $\geq$30A, $\geq$30M, $\geq$30E. Medium-viscosity cellulose nitric esters of different nitrogen contents are classed accordingly by ISO 14446 into the following groups: 18 E to 29 E, 18 M to 29 M, 18 A to 29 A. High-viscosity cellulose nitric esters of different nitrogen contents, accordingly, under ISO 14446, are: $\leq$17 E, $\leq$17 M and $\leq$17 A.

Mixtures of different types of the abovementioned suitable cellulose nitric esters can also be employed.

In the commercially customary form, the nitrocellulose is usually supplied desensitized, Examples of typical desensitizers are alcohols or water. The amount of desensitizers is between 5% to 40% by weight. To produce the dispersions of the invention it is preferred to use nitrocelluloses which have been damped with alcohols or water. One particularly preferred form uses nitrocellulose damped with 10% to 40% by weight of isopropanol (based on the total mass of the as-supplied form). Examples include "Walsroder®nitrocellulose E 560 isopropanol 30%" and "Walsroder® nitrocellulose A 500 isopropanol 30%" and "Walsroder® nitrocellulose E 560 water 30%".

Preferably the nitrocellulose is added after step B) and before the dispersing in water C). For the purpose of its addition the nitrocellulose is added in solution in an organic solvent or solvent mixture, more preferably in solution in an aliphatic ketone, and very preferably in solution in acetone.

Finally, in stage E), solvent present in the NC-PU dispersions (1) described as above is separated off by distillation.

The residual organic solvent content after the distillation is less than 5% by weight, preferably $\leq$2% by weight, more preferably $\leq$1% by weight.

The pH of the dispersions essential to the invention is typically less than 9.0, preferably less than 8.5, more preferably less than 8.0.

The solids content of the NC-PU dispersions (1) essential to the invention is typically 20% to 65%, preferably 25% to 60%, more preferably 30% to 50%, and very preferably from 35% to 45%, by weight.

The NC-PU dispersions (I) essential to the invention preferably contain, based on the solids, 1% to 90%, more preferably 10% to 70% and very preferably 20% to 60% by weight of nitrocellulose.

The nitrocellulose-polyurethanepolyurea particles present in the NC-PU dispersions (1) essential to the invention have an average particle size of 20 to 700 mm, preferably 30 to 400 nm.

The aqueous PU dispersions (II) further required in order to prepare the NC-PU dispersions of the invention are prepared in the same way as for the NC-PU dispersions (I) from the aforementioned components, but without the addition of nitrocellulose in Step D), and so are nitrocellulose-free.

In the preparation of the NC-PU dispersions of the invention the NC-PU dispersions (I) are mixed with the PU dispersions (II) in a ratio to one another such as to result in a ratio of nitrocellulose-polyurethanepolyurea particles to nitrocellulose-free polyurethanepolyurea particles of the aforementioned kind.

The solids content of the NC-PU dispersions of the invention is 10% to 70%, preferably 20% to 65% and more preferably 30% to 63% by weight in this case.

The amount of nitrocellulose in the resulting NC-PU dispersions of the invention, based on the total solids, is 0.5% to 85%, preferably 5% to 75%, more preferably 10% to 60%, very preferably 20% to 40% by weight.

The NC-PU dispersions of the invention can be prepared in a particularly advantageous way by mixing an NC-PU dispersion (I) having a high solids content, based on the solids content of the NC-PU dispersion to be prepared, with a PU dispersion (II) of lower solids content, in a proportion such that the desired target solids is attained.

The NC-PU dispersions of the invention may further comprise antioxidants and/or light stabilizers and/or other auxiliaries and adjuvants such as, for example, emulsifiers, defoamers and thickeners. Finally it is also possible for fillers, plasticizers, pigments, silica sols, aluminium dispersions, clay dispersions, flow control agents or thixotropic agents to be present.

Depending on the desired pattern of properties and end use of the NC-PU dispersions of the invention, it is possible for up to 70% by weight, based on total dry matter, of such fillers to be present in the end product.

The invention further provides for the use of the NC-PU dispersions of the invention in the production of single-coat or multi-coat paint systems for—for example—clearcoat or topcoat applications, and also to the resultant coating compositions and coatings.

Coatings can be produced by the various spray methods such as, for example, air-pressure, airless or electrostatic spraying methods, using one-component or, where appropriate, two-component spraying units. The paints and coating compositions comprising the dispersions of the invention may alternatively be applied by other techniques, such as by brushing, rolling, casting, knife coating, dipping, printing or other methods known from the prior art, for example.

Examples of substrates suitable for coating include woven and non-woven textiles, leather, paper, hard fibres, straw, paperlike materials, wood, glass, any of a very wide variety of plastics, ceramic, stone, concrete, bitumen, porcelain, metals or glass fibres or carbon fibres, particular preference being given to wood and paper.

The NC-PU dispersions of the invention are likewise suitable for producing sizes, adhesive systems, cosmetics or printing inks.

The present invention additionally provides substrate systems comprising at least one coat obtainable using the NC-PU dispersions of the invention.

EXAMPLES

Unless noted otherwise, all percentages are by weight.

The solids contents were determined in accordance with DIN-EN ISO 3251.

Unless expressly mentioned otherwise, nitrocellulose contents were determined volumetrically in accordance with DIN-EN ISO 11909. In the case of the blends the nitrocellulose content was calculated.

The average particle sizes of the dispersions were determined by means of laser correlation spectroscopy measurements (Zetasizer 1000, Malvern Instruments, Malvern, UK).

T3 Drying:

The dispersion or dispersion mixture under test is first adjusted to a solids of 30%. Then the coating system is applied using a box-type coating bar with a 150 μm slot to a glass plate which has been cleaned beforehand with acetone (propan-2-one). The stopwatch is started immediately after coating. At short intervals of time a defined paper disc, weighted with a 200 g weight (specific load according to DIN 53150 approximately 50 g/cm$^2$), is applied to the sample plate. After 60 seconds the sample plate is dropped vertically from a small height onto the platform (the weight is removed from the sample plate). Drying level T3 is obtained when the paper disc falls from the sample plate following the drop onto the platform. The final time in minutes is reported.

Diaminosodium sulphonate: $NH_2$—$CH_2CH_2$—NH—$CH_2CH_2$—$SO_3Na$ (45% strength in water)

PolyTHF®2000: polytetramethylene glycol polyol, OH number 56 mg KOH/g, number-average molecular weight 2000 g/mol (BASF AG, Ludwigshafen, DE)

PolyTHF®1000: polytetramethylene glycol polyol, OH number 112 mg KOH/g, number-average number-average molecular weight 1000 g/mol (BASF AG, Ludwigshafen, DE)

WALSRODER NITROCELLULOSE E560/30% water; medium-viscosity nitrocellulose having a nitrogen content between 11.8% to 12.3%, ISO 14446: 23 E, Wolff Cellulosics GmbH & Co. KG, Bomlitz DE Example 1

NC-PU Dispersion NC-PUD 1

131.8 g of a difunctional polyester polyol based on adipic acid and hexanediol and neopentyl glycol (average molecular weight 1700 g/mol, OHN=about 66 mg KOH/g solids) was heated to 65° C. Then, at 65° C., over the course of 5 minutes, 23.3 g of hexamethylene diisocyanate were added and the mixture was stirred at 100° C. until the theoretical NCO value of 3.3% was reached. The completed prepolymer was dissolved with 275.7 g of acetone at 50° C. and then a solution of 4.1 g of diaminosodium sulphonate 6.1 g of water was metered in over the course of 5 minutes. The subsequent stirring time was 15 minutes. Thereafter, over the course of 5 minutes, a solution of 354 g of WALSRODER NITROCELLULOSE E560/30% water and 1547 g of acetone was added. Dispersing was carried out by adding 560 g of water over the course of 10 minutes. In a subsequent distillation step the solvents were removed under reduced pressure to give a storage-stable NC-PU dispersion having a solids content of 40.9% and an average particle size of 353 nm.

Example 2

NC-PU Dispersion NC-PUD 2

131.8 g of a difunctional polyester polyol based on adipic acid and hexanediol and neopentyl glycol (average molecular weight 1700 g/mol, OHN=about 66 mg KOH/g solids) was heated to 65° C. Then, at 65° C., over the course of 5 minutes, 23.3 g of hexamethylene diisocyanate were added and the mixture was stirred at 100° C. until the theoretical NCO value of 3.3% was reached. The completed prepolymer was dissolved with 275.7 g of acetone at 50° C. and then a solution of 2.84 g of diaminosodium sulphonate, 0.96 g of ethylenediamine and 4.26 g of water was metered in over the course of 5 minutes. The subsequent stirring time was 15 minutes. Thereafter, over the course of 5 minutes, a solution of 100 g of WALSRODER NITROCELLULOSE E560/30% water and 437 g of acetone was added. Dispersing was carried out by adding 560.5 g of water over the course of 10 minutes. In a subsequent distillation step the solvents were removed under reduced pressure to give a storage-stable PUR dispersion having a solids content of 41.0% and an average particle size of 283 nm.

Example 3

NC-PU-Dispersion NC-PUD 3

A mixture of 23.3 g of the difunctional polyether polyol PolyTHF®1000 and 108.5 g of the difunctional polyether polyol PolyTHF® 2000 was heated to 65° C. Then, at 65° C., over the course of 5 minutes, a mixture of 15.4 g of isophorone diisocyanate and 11.7 g of hexamethylene diisocyanate were added and the mixture was stirred at 100° C. until the theoretical NCO value of 3.3% was reached. The completed prepolymer was dissolved with 275.7 g of acetone at 50° C. and then a solution of 2.44 g of diaminosodium sulphonate, 1.30 g of ethylenediamine and 3.66 g of water was metered in over the course of 5 minutes. The subsequent stirring time was 15 minutes. Thereafter, over the course of 5 minutes, a solution of 158.4 g of WALSRODER NITROCELLULOSE E560/30% water and 691.8 g of acetone was added. Dispersing was carried out by adding 560.5 g of water over the course of 10 minutes. In a subsequent distillation step the solvents were removed under reduced pressure to give a storage-stable PUR dispersion having a solids content of 60.6% and an average particle size of 232 nm.

Example 4

PU Dispersion PUD 1

131.8 g of a difunctional polyester polyol based on adipic acid and hexanediol and neopentyl glycol (average molecular weight 1700 g/mol, OHN=about 66 mg KOH/g solids) was heated to 65° C. Then, at 65° C., over the course of 5 minutes, 23.3 g of hexamethylene diisocyanate were added and the mixture was stirred at 100° C. until the theoretical NCO value of 3.3% was reached. The completed prepolymer was dissolved with 275.7 g of acetone at 50° C. and then a solution of 8 g of diaminosodium sulphonate, 1.9 g of ethylenediamine and 40 g of water was metered in over the course of 5 minutes. Dispersing was carried out by adding 200 g of water over the course of 10 minutes. The subsequent stirring time was 15 minutes.

Example 5

PU Dispersion PUD 2

288 g of a difunctional polycarbonate polyol based on hexanediol (average molecular weight 2000 g/mol, OHN=about 56 mg KOH/g solids), 91 g of a difunctional polyether polyol based on propylene glycol (average molecular weight 2000 g/mol, OHN=about 56 mg KOH/g solids), 5 g of dimethylolpropionic acid, and 15.5 g of a monofunctional polyether based on ethylene oxide/propylene oxide, with a number-average molecular weight of 2250 g/mol, OH number 25 mg KOH/g, were heated to 65° C. Then, at 65° C., over the course of 5 minutes, 70 g of hexamethylene diisocyanate were added and the mixture was stirred at 100° C. for 3 hours. The completed prepolymer was dissolved with 800 g of acetone at 50° C. and then a solution of 3.2 g of ethylenediamine, 1.7 g of hydrazine hydrate, and diaminosodium sulphonate in 120 g of water was metered in over the course of 5 minutes. Dispersion was carried out with a further 600 g of water. The subsequent stirring time was 15 minutes.

Example 6

PU Dispersion PUD 3

250 g of a difunctional polycarbonate polyol based on hexanediol (average molecular weight 2000 g/mol, OHN=about 56 mg KOH/g solids), 11.8 g of dimethylolpropionic acid, 6.9 g of 1,4-butanediol and 20 g of a monofunctional polyether based on ethylene oxide/propylene oxide, with a number-average molecular weight of 2250 g/mol, OH number 25 mg KOH/g, were heated to 65° C. Then, at 65° C., over the course of 5 minutes, 44.5 g of hexamethylene diisocyanate and 58.8 g of isophorone diisocyanate were added and the mixture was stirred at 100° C. for 3 hours. The completed prepolymer was dissolved with 800 g of acetone at 50° C. and then a solution of 5.8 g of ethylenediamine, 2.2 g of hydrazine hydrate, and 5.2 g of N,N-dimethylethanolamine and 50 g of water was metered in over the course of 5 minutes. Dispersion was carried out with a further 550 g of water. The subsequent stirring time was 15 minutes.

In the examples described in the table it is shown that the modification of a pure aqueous PUD with nitrocellulose has a very beneficial effect on the drying at ambient temperature. The T1 and T3 drying were determined

| Example | Product or mixture | Ratio (SC 30%) | NC content [% by weight] | T3 [min] |
|---|---|---|---|---|
| Comparative 1 | NC-PUD 1 | 1 | 60 | 45 |
| Comparative 2 | NC PUD 2 | 1 | 30 | 130 |
| Comparative 3 | NC-PUD 3 | 1 | 40 | 135 |
| Comparative 4 | PUD 1 | 1 | 0 | 415 |
| Comparative 5 | PUD 2 | 1 | 0 | 105 |
| Comparative 6 | PUD 3 | 1 | 0 | 85 |
| 1 | NC-PUD 1:PUD 1 | 5:1 | 50 | 50 |
| 2 | NC-PUD 1:PUD 1 | 2:1 | 40 | 50 |
| 3 | NC-PUD 1:PUD 1 | 1:1 | 30 | 50 |
| 4 | NC-PUD 1:PUD 1 | 1:2 | 20 | 190 |
| 5 | NC-PUD 1:PUD 1 | 1:11 | 5 | 400 |
| 6 | NC-PUD 5:PUD 1 | 3:1 | 30 | 145 |
| 7 | NC-PUD 5:PUD 1 | 1:1 | 20 | 155 |
| 8 | NC-PUD 5:PUD 1 | 1:3 | 10 | 225 |
| 9 | NC-PUD 1:PUD 2 | 5:1 | 50 | 50 |
| 10 | NC-PUD 1:PUD 2 | 2:1 | 40 | 50 |
| 11 | NC-PUD 1:PUD 2 | 1:1 | 30 | 65 |
| 12 | NC-PUD 1:PUD 3 | 5:1 | 50 | 50 |
| 13 | NC-PUD 1:PUD 3 | 2:1 | 40 | 50 |
| 14 | NC-PUD 1:PUD 3 | 1:1 | 30 | 50 |

It is clearly apparent from the examples that the aqueous, nitrocellulose-containing polyurethane dispersion mixtures of the invention dry much more quickly than the pure aqueous polyurethane dispersions on which they are based.

If Example 3 is compared with Comparative Example 2 it can be seen that the blend dries even more quickly than the aqueous, nitrocellulose-containing polyurethane dispersion having the same nitrocellulose content.

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

The invention claimed is:

1. An aqueous NC-PU dispersion comprising nitrocellulose-polyurethanepolyurea particles having an average particle size of 20 to 700 nm and also nitrocellulose-free polyurethanepolyurea particles having an average particle size of 20 to 700 nm as measured by laser correlation spectroscopy, wherein the ratio of nitrocellulose-polyurethanepolyurea particles to nitrocellulose-free polyurethanepolyurea particles is 100:1 to 1:100.

2. The aqueous NC-PU dispersion of claim 1, wherein the dispersion is plasticizer-free and contains equal or less than 1% by weight of organic solvents.

3. The aqueous NC-PU dispersion of claim 1, wherein the dispersion has a solids content, based on nitrocellulose-polyurethanepolyurea particles and nitrocellulose-free polyurethanepolyurea particles, of 30% to 63% by weight.

4. The aqueous NC-PU dispersion of claim 2, wherein the dispersion has a solids content, based on nitrocellulose-polyurethanepolyurea particles and nitrocellulose-free polyurethanepolyurea particles, of 30% to 63% by weight and the ratio of nitrocellulose-polyurethanepolyurea particles to nitrocellulose-free polyurethanepolyurea particles is 100:1 to 1:100.

5. A process for preparing aqueous NC-PU dispersion comprising mixing an aqueous NC-PU dispersion (I) which comprises nitrocellulose-polyurethanepolyurea particles having an average particle size of 20 to 700 nm with an aqueous PU dispersion (II) comprising nitrocelluose-free polyurethanepolyurea particles having an average particle size of 20 to 700 nm, wherein the ratio of nitrocellulose-polyurethanepolyurea particles to nitrocellulose-free polyurethanepolyurea particles is 100:1 to 1:100.

6. The process of claim 5, wherein the NC-PUD dispersion (I) are obtained by preparing
   A) isocyanate-functional prepolymers from
      A1) organic polyisocyanates,
      A2) polymeric polyols having number-average molecular weights of 400 to 8000 g/mol and OH functionalities of 1.5 to 6,
      A3) hydroxy-functional compounds having molecular weights of 62 to 399 g/mol and
      A4) isocyanate-reactive, anionic or potentially anionic and optionally nonionic hydrophilicizing agents,
   B) whose free NCO groups are then reacted wholly or partially, before, during or after the addition of an organic solvent, with
      B1) amino-functional compounds having molecular weights of 32 to 399 g/mol and/or
      B2) amino-functional, anionic or potentially anionic hydrophilicizing agents, with chain extension,
   C) dispersing the prepolymers in water before, during or after step B), any potentially ionic groups present being converted into the ionic form by partial or complete reaction with a neutralizing agent,
   D) adding nitrocellulose in the form of a solution in an organic solvent or solvent mixture after step A) but before step C), and
   E) removing organic solvent present by distillation to leave an amount of below 5% by weight.

7. The process of claim 6, wherein said polymeric polyols have number-average molecular weights of 400 to 6000 g/mol and OH functionalities of 1.8 to 3.

8. The process of claim 6, wherein said polymeric polyols have number-average molecular weights of 600 to 3000 g/mol, and OH functionalities of 1.9 to 2.1.

9. The process of claim 5, wherein the PU dispersion (II) is obtained by preparing
   a) isocyanate-functional prepolymers from
      a1) organic polyisocyanates,
      a2) polymeric polyols having number-average molecular weights of 400 to 8000 g/mol and OH functionalities of 1.5 to 6,
      a3) hydroxy-functional compounds having molecular weights of 62 to 399 g/mol and
      a4) isocyanate-reactive, anionic or potentially anionic and optionally nonionic hydrophilicizing agents,
   b) whose free NCO groups are then reacted wholly or partially, before, during or after the addition of an organic solvent, with
      b1) amino-functional compounds having molecular weights of 32 to 399 g/mol and/or
      b2) amino-functional, anionic or potentially anionic hydrophilicizing agents, with chain extension,
   c) dispersing the prepolymers in water before, during or after step B), any potentially ionic groups present being converted into the ionic form by partial or complete reaction with a neutralizing agent,
   d) removing organic solvent present by distillation to leave an amount of below 5% by weight.

10. The process of claim 6, wherein the PU dispersion (II) is obtained by preparing
   a) isocyanate-functional prepolymers from
      a1) organic polyisocyanates,
      a2) polymeric polyols having number-average molecular weights of 400 to 8000 g/mol and OH functionalities of 1.5 to 6,
      a3) hydroxy-functional compounds having molecular weights of 62 to 399 g/mol and
      a4) isocyanate-reactive, anionic or potentially anionic and optionally nonionic hydrophilicizing agents,
   b) whose free NCO groups are then reacted wholly or partially, before, during or after the addition of an organic solvent, with
      b1) amino-functional compounds having molecular weights of 32 to 399 g/mol and/or
      b2) amino-functional, anionic or potentially anionic hydrophilicizing agents, with chain extension,
   c) dispersing the prepolymers in water before, during or after step B), any potentially ionic groups present being converted into the ionic form by partial or complete reaction with a neutralizing agent,
   d) removing organic solvent present by distillation to leave an amount of below 5% by weight.

11. The process of claim 9, wherein said polymeric polyols have number average molecular weights of 400 to 6000 g/mol and OH functionalities of 1.8 to 3.

12. The process of claim 9, wherein said polymeric polyols have number-average molecular weights of 600 to 3000 g/mol, and OH functionalities of 1.9 to 2.1.

13. The process of claim 10, wherein said polymeric polyols have number-average molecular weights of 600 to 3000 g/mol, and OH functionalities of 1.9 to 2.1.

14. The process of claim 5, wherein the NC-PU dispersion (I) and the PU dispersion (II) independently of one another have a solids content of 20% to 65% by weight.

15. The process of claim 6, wherein the NC-PU dispersion (I) has a nitrocellulose content, based on the solids, of 20% to 60% by weight.

16. A single-coat or multi-coat paint system which comprises the aqueous NC-PU dispersion of claim 1.

17. A coating composition comprising the aqueous NC-PU dispersion of claim 1.

18. A substrate coated with the coatings composition of claim 17.

* * * * *